United States Patent Office.

BENJAMIN S. HARRINGTON, OF PONTIAC, MICHIGAN, ASSIGNOR TO HIMSELF, C. S. GREEN, J. D. SHULTS, AND M. S. ANGELL.

Letters Patent No. 86,836, dated February 9, 1869.

---

IMPROVED COMPOUND FOR ORNAMENTAL PAINTING, GRAINING, &c.

---

The Schedule referred to in these Letters Patent and making part of the same.

---

*To whom it may concern:*

Be it known that I, BENJAMIN S. HARRINGTON, of Pontiac, in the county of Oakland, and State of Michigan, have invented a new and useful Improvement in Compound for Ornamental Painting, Graining, Marbling, &c.; and I do declare that the following is a true and accurate description thereof.

The nature of this invention relates to a new preparation to be used in ornamental painting, graining, or marbling.

It consists in using one part of acetic acid and six parts of soft water, mixed together. The same quantity of vinegar or sour beer may be used, as a substitute. This mixture is used to dissolve the paints to be used.

Then I take one part of molasses and one part of gum-arabic, or one-quarter the quantity of white glue. These are used for their adhesive qualities, and mixed with the acid and water.

For a drier, I add one part of alcohol and one part of spirits of turpentine, or their equivalents.

I add to the above, a small quantity of oil of anise or wintergreen, to destroy the unhealthy and disagreeable smell of the turpentine and acids.

When the above ingredients are mixed, they are used in the following manner:

Dip a sponge or brush into the preparation, and then into any dry colors which it is desirable to use.

When the paint is laid on, take equal parts of olive and linseed-oil, and sufficient Spanish whiting to form a dough or putty, which may be moulded into a thousand fanciful forms, and rolled over the painted surface, to cloud, marble, or grain, thereby dispensing with patterns, and performing the work of hours in a few moments, at a greatly reduced cost of materials.

Having thus described my invention,

What I claim as my invention, and desire to secure by Letters Patent, is—

A compound, composed of the ingredients and substantially in the proportions herein described, for the purposes set forth.

Also, the method of marbling or graining, by the use of the dough or putty, as herein set forth.

BENJAMIN S. HARRINGTON.

Witnesses:
A. W. BURTT,
H. M. LOOK.